(12) United States Patent
Funge et al.

(10) Patent No.: US 9,319,321 B2
(45) Date of Patent: Apr. 19, 2016

(54) WEB SERVER CONSTRAINT SUPPORT

(75) Inventors: John Funge, Sunnyvale, CA (US);
Mark Watson, San Francisco, CA (US)

(73) Assignee: NETFLIX, Inc., Los Gatos, CA (US)

( * ) Notice: Subject to any disclaimer, the term of this patent is extended or adjusted under 35 U.S.C. 154(b) by 847 days.

(21) Appl. No.: 13/328,921

(22) Filed: Dec. 16, 2011

(65) Prior Publication Data
US 2013/0159384 A1 Jun. 20, 2013

(51) Int. Cl.
*G06F 15/16* (2006.01)
*H04L 12/813* (2013.01)
*H04L 12/807* (2013.01)
*H04L 29/06* (2006.01)
*H04L 12/801* (2013.01)

(52) U.S. Cl.
CPC .............. *H04L 47/20* (2013.01); *H04L 47/27* (2013.01); *H04L 65/4084* (2013.01); *H04L 65/602* (2013.01); *H04L 65/80* (2013.01); *H04L 47/19* (2013.01)

(58) Field of Classification Search
None
See application file for complete search history.

(56) References Cited

U.S. PATENT DOCUMENTS

| | | | |
|---|---|---|---|
| 6,330,609 B1 * | 12/2001 | Garofalakis et al. | 709/229 |
| 2002/0141446 A1 * | 10/2002 | Koga | 370/468 |
| 2007/0268829 A1 * | 11/2007 | Corwin et al. | 370/235 |
| 2007/0276954 A1 | 11/2007 | Chan et al. | |
| 2008/0104647 A1 | 5/2008 | Hannuksela et al. | |
| 2008/0175148 A1 | 7/2008 | Todd et al. | |
| 2009/0113048 A1 * | 4/2009 | Maze et al. | 709/224 |
| 2009/0193137 A1 | 7/2009 | Pawson | |
| 2010/0094967 A1 * | 4/2010 | Zuckerman et al. | 709/219 |
| 2010/0131671 A1 | 5/2010 | Kohli et al. | |
| 2011/0238789 A1 | 9/2011 | Luby et al. | |

OTHER PUBLICATIONS

Frystyk et al., HTTP Extension Framework. Mar. 15, 1999. Downloaded from <http://www.w3.org/Protocols/HTTP/ietf-http-ext/draft-frystyk-http-extensions-03>.*
International Search Report PCT/US12/069823 dated Feb. 20, 2013.
Loguinov, et al, "End-to-End Rate-Based Congestion Control:Convergence Properties and Scalability Analysis" IEEE/ACM Transactions on Networking, vol. 11, No. 4, Aug. 2003. Retrieved online on Jan. 25, 2013 at <http://www.egr.msu.edu/waves/people/Radha_files/2003/Ton-03-iscc.pdf>.
Extended European Search Report for Application No. 12858581.7 dated Jun. 2, 2015.
Lee, et al., "Quality Adaptive Video Streaming Mechanism Using the Temporal Scalability", IEICE Trans. Commun. vol. E91-B, No. 1, Nov. 2008, pp. 3584-3594.

* cited by examiner

*Primary Examiner* — Scott B Christensen
(74) *Attorney, Agent, or Firm* — Artegis Law Group, LLP (57) ABSTRACT

Techniques are disclosed for a web server to support constraints specified by a client. In one embodiment, the web server receives, from the client, a request for one or more blocks of data. The request includes one or more constraints provided by the client. The web server may perform an action responsive to an increase in network congestion, based on the one or more constraints. Accordingly, the web server may handle the request in a manner that more closely meets the needs of the client.

20 Claims, 6 Drawing Sheets

WEB SERVER CONSTRAINT SUPPORT

BACKGROUND

1. Field

Embodiments of the present invention generally relate to techniques for processing requests from clients requesting data from a web server and, more specifically, to handling individual client requests based on constraints suggested by the clients.

2. Description of Related Art

Digital content distribution systems typically include a content server, a content player, and a communications network connecting the content server to the content player. The content server is configured to store files (or "streams") available for download from the content server to the content player. Each stream may provide a digital version of, e.g., a movie, a television program, a sporting event, a staged or live event captured by recorded video, etc. Streams may also provide media content created specifically for distribution online. Content files stored on the content server typically are typically organized according to playback chronology and may store audio data and/or video data.

Playback frequently involves a technique known as "streaming," where a content server transmits portions of a stream to a content player, which in turn decodes and initiates playback on the a client device while subsequent portions of the stream are received. To account for variable latency and bandwidth within the communications network, a content buffer on the client device may be used to queue incoming portions of the stream ahead of the portions actually being played. During moments of network congestion (which leads to lower available bandwidth) less data is added to the buffer, which may drain down as data is being de-queued to support playback at a certain playback bit rate. However, during moments of high network bandwidth, the buffer is replenished and additional buffer time is added until the buffer is generally full again. In practical systems, the buffer may queue data corresponding to a time span ranging from seconds to more than a minute.

Streaming digitally encoded audiovisual (AV) programs (including feature length films and television programs) over the Internet has become popular as the availability of high-bandwidth Internet communication has increased, and a variety of different streaming media protocols are available for transmitting media streams to the client. Although many of these protocols were conceived of to transmit media streams from a server to a conventional computing system (e.g., a typical desktop PC or laptop computer), the streaming approach is also being used to transmit streaming media to a variety of end-user client devices; including, e.g., mobile telephones, tablet and net-book computing devices, console and handheld video game systems, digital video recorders (DVRs), DVD players, and dedicated media streaming devices, (e.g., the Roku® set-top box), etc.

SUMMARY

Embodiments of the invention provide a computer-implemented method, computer program product and system for performing an operation for responding to a request to stream data from a server to a client. The operation includes receiving, from the client and by the server, one or more requests for one or more blocks of data, where the one or more requests include one or more suggested constraints for streaming the requested blocks of data to the client. The operation also includes, subsequent to receiving the one or more requests, detecting an increase in network congestion, where the server is configured to reduce, responsive to the increase in network congestion and by a predefined amount, bandwidth for sending data to the client. The operation also includes, upon determining that the one or more suggested constraints cannot be satisfied in servicing the one or more requests using the reduced bandwidth, performing at least one of: (i) abandoning the one or more requests and (ii) reducing the bandwidth by a lesser amount than the predefined amount, to provide bandwidth sufficient to satisfy the one or more suggested constraints.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for a web server to support constraints specified by one or more clients. In one embodiment, the web server receives, from a client, a request for one or more blocks of data related to a streaming media title being decoded and played back by a client. The request may include one or more constraints associated with the one or more blocks of data, where the constraints are suggested by the client. For example, a constraint may specify a timing constraint, a rate constraint, or a dependency constraint. The web server may evaluate each constraint relative to a then current level of network congestion and respond to the request based on the evaluation. Doing so allows the web server to operate more efficiently at least in some cases, such as for streaming digital media content or other data.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
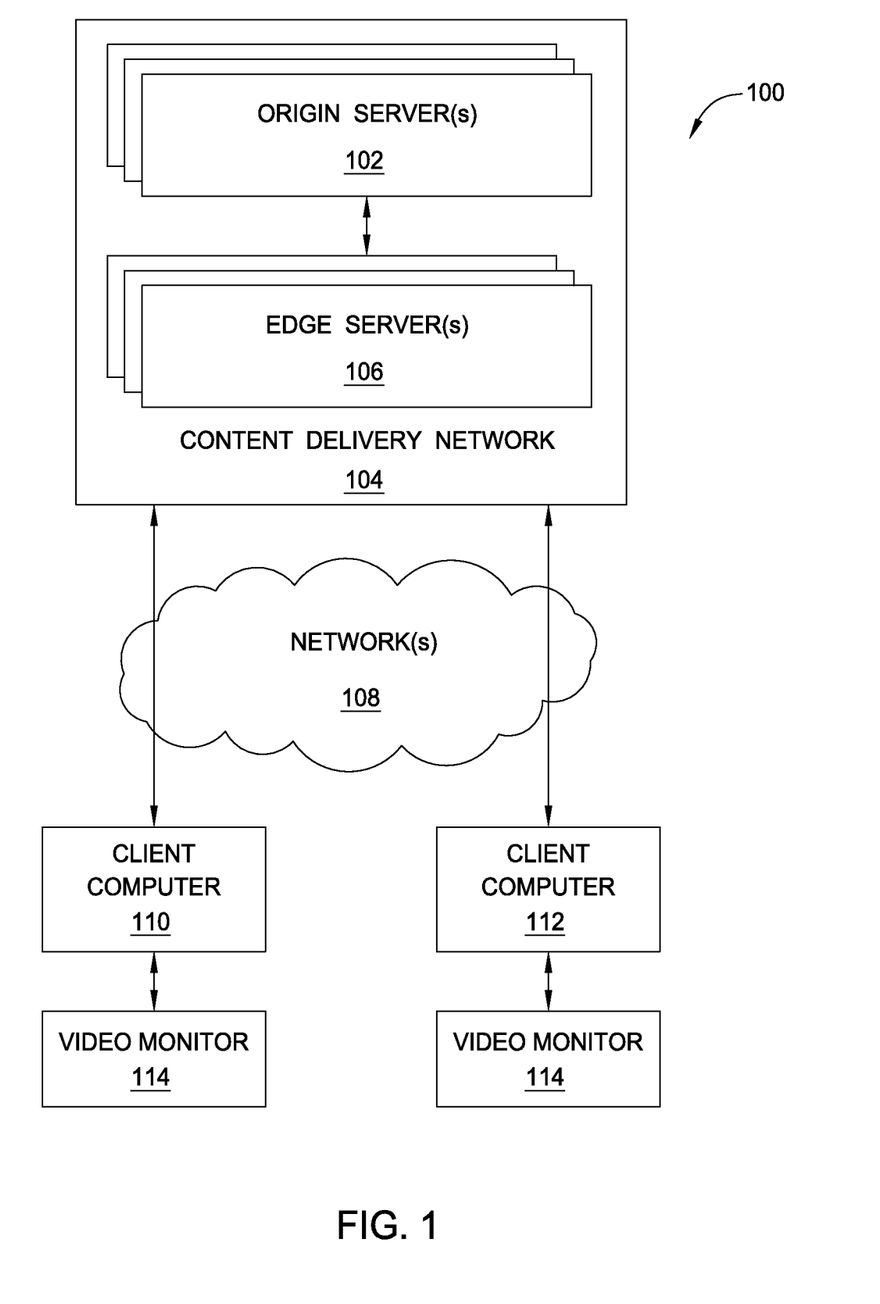
FIG. 1 illustrates a content distribution system configured to implement one or more aspects of the present invention.

FIG. 1 illustrates a content distribution system 100 configured to implement one or more aspects of the present invention. As shown, the content distribution system includes one or more origin servers 102, one or more edge servers 106, networks 108, a client computer 110 and a client computer 112.

The origin servers 102 are coupled to the edge servers 106 as part of a content delivery network (CDN) 104. The origin server computer 102 is configured to store a first copy of an audiovisual media file and acts as an authoritative repository or master storage location for media files. The origin server computer 102 stores the audiovisual media file in any technically feasibly fashion on technically feasible media. For example the mass storage unit 316 may comprise a redundant array of independent disks (RAID) system incorporating a conventional file system.

Edge servers 106, of which there may be many in a particular CDN 104, typically are located logically or physically closer to the client computer 110 and the client computer 112 that the edge servers 106 serves. Each of the client computer 110 and the client computer 112, of which there may be thousands, are coupled directly or indirectly through the networks 108 to the edge servers 106. The client computers 110, 112 are not restricted to operating with one edge servers 106 as depicted but may connect to any of a large number of edge servers 106 as needed to obtain media files for decoding and display to a user.

Although, in the above description, the CDN 104 includes two levels of server, the origin servers 102 and the edge servers 106, persons skilled in the art will recognize that the architecture of FIG. 1 contemplates only an exemplary embodiment of the invention. Other embodiments may include additional middle-tier levels of servers between the origin servers 102 and the edge servers 106, or a single-tier CDN 104. Thus, FIG. 1 is in no way intended to limit the scope of the present invention in any way.

Each of the client computer 110 and the client computer 112 is coupled to a different video monitor 114 and is configured to decode received media files and deliver an output signal to the respective video monitor 114. In one embodiment, a client computer 110 and the client computer 112 may comprise a set-top box configured to receive streaming audiovisual media from the CDN 104, to convert the media to one or more output signals in a specified audiovisual format, and to provide the one or more output signals to an audiovisual output. In another embodiment, the client computer 110 or the client computer 112 may comprise a digital disc media player, such as a Blu-ray player, configured to receive streaming audiovisual media from a CDN 104, to convert the media to one or more output signals in a specified audiovisual format, and to provide the one or more output signals to an audiovisual output. In another embodiment, the client computer 110 and the client computer 112 may comprise a personal computer, laptop computer, notebook computer, or handheld computer. Embodiments also encompass a computer program product that can be loaded into a computer to perform the functions that are described herein.

In operation, the client computer 110 and the client computer 112 transmit download requests to the edge servers 106 within the CDN 104 for downloading audiovisual media files. In response to download requests, the edge servers 106 transmits the audiovisual media files (or units thereof) to requesting client computer. Further, each edge server 106 may be a web server. As noted above, the process of downloading a particular audiovisual media file from the CDN 104 for playback is referred to herein as "streaming".

Further, in context of this disclosure, the web server may process a request based on constraints provided with the request by the client computer. For example, based on the constraints and network conditions, the web server may allocate additional bandwidth for servicing the request. Alternatively, the web server may stop servicing the request. Doing so avoids unnecessarily sending data to the client computer at least in some cases, e.g., when any data that is sent would be received by the client computer at a time that is too late for the data to be of any value to the client computer. For example, suppose the client computer requests a video stream of a given bitrate. If an increase in network congestion occurs, the client computer may switch to a corresponding video stream of a lower bitrate, to avoid any sudden interruptions in playback of the video stream to a user. In such a scenario, the web server may stop sending the high-bit rate content to the client. Alternatively, the web server may allocate additional bandwidth for sending the video stream of the given bitrate to the client computer, such that the client computer does not need to switch to a video stream of a lower bitrate. Stopping the sending of the video stream of the given bitrate or allocating additional bandwidth for sending the video stream of the given bitrate may improve performance of the web server and/or the network in at least some cases.

Figure 2:
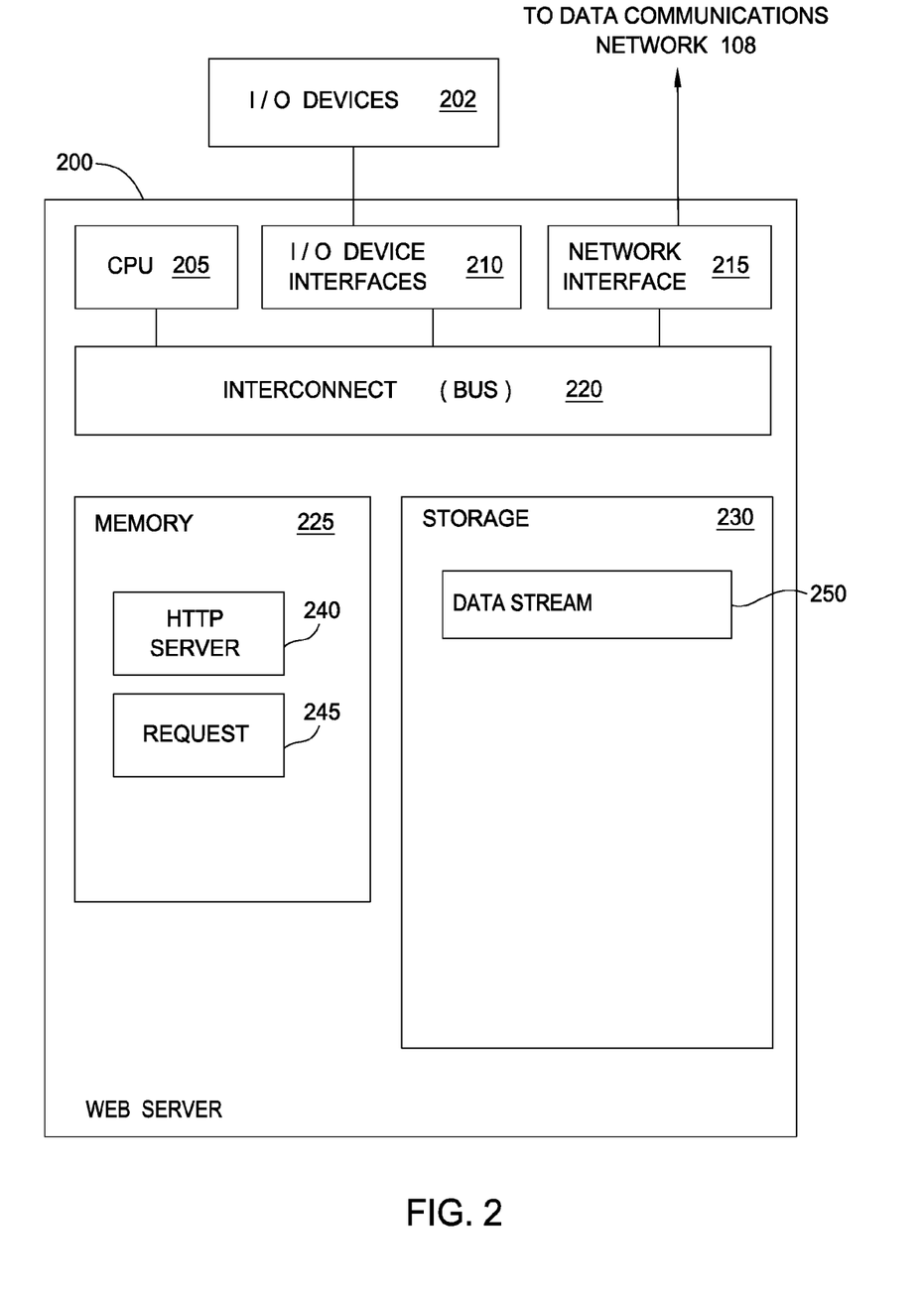
FIG. 2 illustrates a detailed view of a web server, according to one embodiment of the invention.

FIG. 2 illustrates a detailed view of a web server 200, according to one embodiment of the invention. As shown, the server computing system 200 includes, without limitation, a central processing unit (CPU) 205, a network interface 215, an interconnect 220, a memory 225, and storage 230. The web server 200 may also include an I/O devices interface 210 (e.g., keyboard, display and mouse devices). Of course, one of ordinary skill in the art will recognize that in practice the content encoding and streaming functions described relative to the web server 200 may be performed on separate computer systems.

The CPU 205 retrieves and executes programming instructions stored in the memory 225. Similarly, the CPU 205 stores and retrieves application data residing in the memory 225. The interconnect 220 facilitates transmission, such as of programming instructions and application data, between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, or optical storage, network attached storage (NAS), or a storage area-network (SAN).

Illustratively, the memory 225 includes a Hypertext Transfer Protocol (HTTP) server 240 and a request 245, and the storage 230 includes data stream 250. In one embodiment, the data stream 250 represents a digital media content title. In practice, many distinct digital media content titles may be available for streaming from server 200. In alternative embodiments, the data stream 250 represents any data that may be requested by a client device. Further, the data stream 250 may include one or more discrete blocks of data. In context of this disclosure, e.g., a data stream may include one or more blocks representing frames of video data to be decoded and played back by a claimed (as well as blocks of audio data or blocks of combined audiovisual data)). Such blocks may be encoded using a specific protocol (e.g., MPEG). The HTTP server 240 is configured to receive and respond to requests 245 from a client device for blocks in the data stream 250. In some embodiments, each request specifies a single block of data to return to the client. In other embodiments, each request may specify multiple blocks of data to return to the client.

In one embodiment, the HTTP server 240 is also configured to send an index of the data stream 250 to the client device. The index includes entries mapping block identifiers to block offsets within the data stream 250. Based on the index, the client device generates HTTP-GET requests having a URL with parameters indicating byte offsets within the data stream 250. Responsive to such requests, the HTTP server 240 may transmit the one or more blocks to the client device. The client device may then buffer the received blocks and pass the blocks to a playback engine for decoding and playback.

Although embodiments are described herein with reference to the client device using the index to generate requests for blocks of data, other embodiments are broadly contemplated. For example, the client device may use the index to generate requests for any chunk of data, where each chunk of data is a subset of data in the data stream 250, and where each chunk of data does not necessarily correspond to a block of data as specified by the index. To avoid obscuring the invention, embodiments are described herein with reference to requests for "blocks" of data, rather than "chunks" of data. However, such description is not intended to be limiting of the invention.

In one embodiment, the HTTP server 240 and the client are both configured to support an extension to the HTTP protocol specifying a set of constraints that may be suggested by the client to the HTTP server 240. To this end, the client may include such constraints in HTTP requests sent to the HTTP server 240. Note however, the suggested constraints may not necessarily be honored by the HTTP server 240. As such, the suggested constraints may be viewed as hint metadata assisting the HTTP server 240 in processing the requests more efficiently at least in some cases. Further, the HTTP server 240 is configured to evaluate the suggested constraints when processing a corresponding request. Each constraint may pertain to a corresponding block of data requested by the client.

For example, the constraints specified in an HTTP request could be a timing constraint, a rate constraint, or a dependency constraint. A timing constraint specifies a expiration time, which is a time beyond which the block is not desired by (or is of no use to) the client. The timing constraint may also be referred to as an expiry constraint. A rate constraint specifies a maximum and/or minimum sending rate desired by the client. In one embodiment, multiple blocks may be specified by a single request or by multiple requests. In either case, a dependency constraint may specify that a second block is not desired by (or is of no use to) the client unless a first block is received by the client.

For example, suppose that the data stream 250 is a digital media content stream encoded according to Scalable Video Coding (SCV) techniques. In such a case, the data stream 250 may include a base layer and an enhancement layer. The enhancement layer is dependent on the base layer because the enhancement layer stores modifications to the base layer for producing a content stream of a higher bitrate. Thus, a dependency constraint may be supplied by the client to the HTTP server 240 if the first block is from the base layer and the second block is from the enhancement layer. Doing so prevents data from being unnecessarily sent to the client at least in some cases. More specifically, where the client will not receive data from the base layer, the HTTP server 240 may refrain from unnecessarily sending data from the enhancement layer to the client. This is because data from the enhancement layer is of no use to the client, absent data from the base layer.

In one embodiments, the extension to the HTTP protocol is supported in a manner that is backward-compatible with clients and/or HTTP servers that do not support the extension. More specifically, the extended HTTP server is configured to handle requests from both clients that support the extension and clients that do not support the extension. Similarly, the extended client is configured to interoperate with both HTTP servers that support the extension and HTTP servers that do not support the extension.

Extending the HTTP protocol to support client-suggested constraints, allows the HTTP server 240 and client devices to efficiently use available network bandwidth when streaming data. More specifically, when the HTTP server 240 determines that a constraint cannot be fulfilled, the HTTP server 240 may decline the request. For example, the HTTP server 240 may determine that the constraint cannot be fulfilled as a result of a sudden increase in network congestion, which may be determined by detecting an increased occurrence of packet loss. The request may be declined before any of the requested data is sent to the client device. Alternatively, the request may be declined after only part of the requested data is sent to the client device. At least in some embodiments, when a request is declined, the HTTP server 240 may also send the client device an indication that the request is declined. Further, a different indication may be sent when the request is declined before any of the requested data is sent, compared to when the request is declined after some of the requested data has been sent. Accordingly, adopting the extended HTTP protocol may prevent data from being unnecessarily sent to a client device. Bandwidth between the HTTP server 240 and the client device may be conserved as a result.

As described above, in one embodiment, the client does not decide whether to cancel a request. Instead, the server may decline to fulfill a request when the constraints cannot be satisfied. Configuring the server (rather than the client) with the functionality of monitoring the network congestion and the decision of declining a request may allow requests to be declined at least earlier—at least to an extent proportional to the latency between the server and the client. More specifically, requests may be declined earlier because the server detects network congestion by maintaining a running average of estimated round-trip time at the TCP level, while the client, operating at the HTTP level, maintains a running average that is delayed relative to the one maintained by the server.

Further still, at least in some embodiments, the HTTP server 240 is not configured with any functionality specific to streaming video. Accordingly, the general-purpose nature of the HTTP server 240 may be retained. Put another way, the HTTP server 240 remains agnostic to the type of underlying data being streamed. Retaining the general-purpose nature of the HTTP server 240 may be advantageous for several reasons. For example, the HTTP server 240 may stream data of a wider variety of types. Further, it may generally be less costly to acquire, operate, and/or maintain a general-purpose HTTP server than a streaming video server. Further still, in the context of a client communicating with multiple servers of a CDN to acquire a given data stream, HTTP servers may impose fewer restrictions on which server a client may communicate with to acquire the data stream, as compared to streaming video servers, which may require that the client communicate with the same streaming video server for the entire data stream.

As used herein, a streaming video server refers to a server configured to provide clients with streaming video (or services related to streaming video). For instance, a server configured to parse a group-of-pictures (GOP) structure of a video stream—e.g., functionality beyond simple HTTP range requests—is specific to streaming video. Accordingly, by using the techniques disclosed herein, the HTTP server 240 may be configured to stream a broad variety of data with improved performance and without incurring the expense of and/or introducing the complexity found in a streaming video server.

As described above, in one embodiment, the HTTP protocol may be extended to provide client-suggested constraints. For example, in one embodiment, the HTTP server 240 may decline a request based on an evaluation of the suggested constraints included in a request from a client. Alternatively, the HTTP server 240 may perform congestion control based on the suggested constraints. For example, the HTTP server 240 may be configured with a congestion control algorithm to account the suggested constraints. For instance, suppose that the HTTP server 240 is configured to reduce a congestion window that is maintained by the HTTP server 240. The congestion window refers to a window in Transmission Control Protocol (TCP) maintained by a sender of data that determines, at least in part, the number of bytes that have been sent but not yet acknowledged by a receiver of the data.

Suppose, e.g., that the HTTP server 240 is configured to reduce the congestion window by a predefined extent—such as by half of the congestion window—after detecting an increase in network congestion. In such a case, the HTTP server 240 may also determine that the suggested constraints (included in a request from a client for a block of data) will not be satisfied if the congestion window is reduced by half. For example, the request from a client may include a timing constraint specifying that the block needs to be received by the client by a given time, $t_1$. The HTTP server 240 may determine that if the congestion window is reduced by half, the block will not be received by the client by the given time $t_1$. The determination that the one or more suggested constraints will not be satisfied may be made either before or after reducing the congestion window by half. In some embodiments, instead of declining (or ceasing servicing) the request, the HTTP server 240 may temporarily allocate additional bandwidth for transmitting the one or more blocks to the client, such that the one or more constraints can be satisfied. If the congestion window has not yet been reduced, the additional bandwidth may be allocated by reducing the congestion window to a lesser extent than the predefined extent, such as by twenty-five percent of the congestion window. If the congestion window has already been reduced by the predefined extent, the additional bandwidth may be allocated by increasing the congestion window such that the lesser extent is reached. Further, the client may be compensate the HTTP server 240 in an amount proportional to the additional bandwidth. In other words, the client may be considered to be indebted to the HTTP server 240 in an amount of at least the additional bandwidth.

In one embodiment, subsequent to sending the one or more blocks to the client, the HTTP server 240 may be compensated by temporarily reducing the congestion window for sending other data to the client—such as other blocks requested by the client. The congestion window for sending other data to the client may be reduced based on one or more bandwidth compensation rules. The bandwidth compensation rules specify how to compute an extent to which the congestion window should be reduced, based on the additional bandwidth that was previously allocated to the client.

Figure 3:
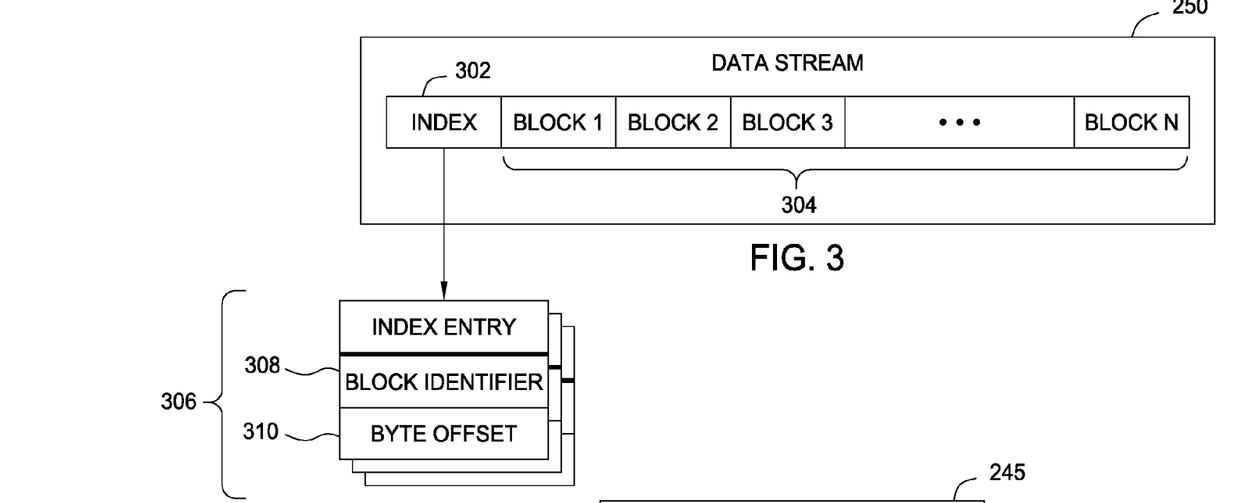
FIG. 3 illustrates a data stream provided by the web server, according to one embodiment of the invention.

FIG. 3 illustrates the data stream 250 of FIG. 2, according to one embodiment of the invention. As shown, the data stream 250 includes an index 302 and a plurality of blocks 304 of data. The index 302 includes a plurality of index entries 306. Each index entry 308 includes a block identifier 308 and an associated byte offset 310. The block identifier 308 identifies a given block 304, and the byte offset specifies an offset, e.g., measured in bytes at which the given block 304 is located within the data stream 250. Although shown to be part of the data stream 250, in alternative embodiments, the index 302 is stored external to the data stream 250. As described above, the client generates requests based on the index 302, where the requests include one or more suggested constraints. The HTTP server 240 takes the suggested constraints into account when sending the blocks 304 to the client responsive to the requests.

Figure 4:
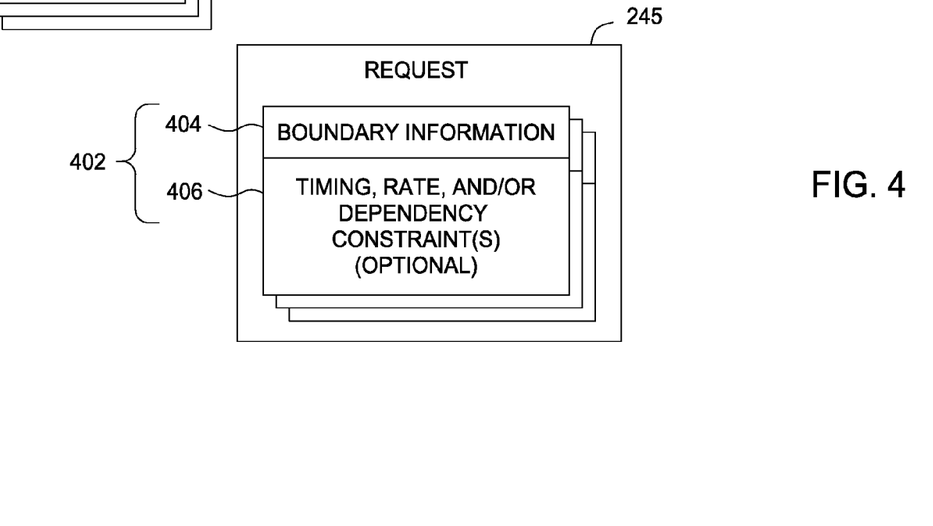
FIG. 4 illustrates a request received by the web server, according to one embodiment of the invention.

FIG. 4 illustrates the request 245 of FIG. 2, according to one embodiment of the invention. As shown, the request 245 includes one or more entries 402. Each entry contains boundary information 404 for a requested block of data. The boundary information 404 may be expressed as one or more byte offsets. For example, the boundary information 404 may be expressed as a first byte offset at which the requested block of data begins and a second byte offset at which the requested block of data ends in the data stream 250. Each entry further contains one or more constraints 406 pertaining to the requested block of data. As described above, each constraint 406 may be a timing constraint, a rate constraint, or a dependency constraint. Using the constraints, the HTTP server 240 can handle client requests in a manner that is more responsive to the needs of the client. For example, the HTTP server 240 may refrain from unnecessarily sending a block of data to the client or temporarily allocate additional bandwidth for sending a block of data to the client.

Figure 5:
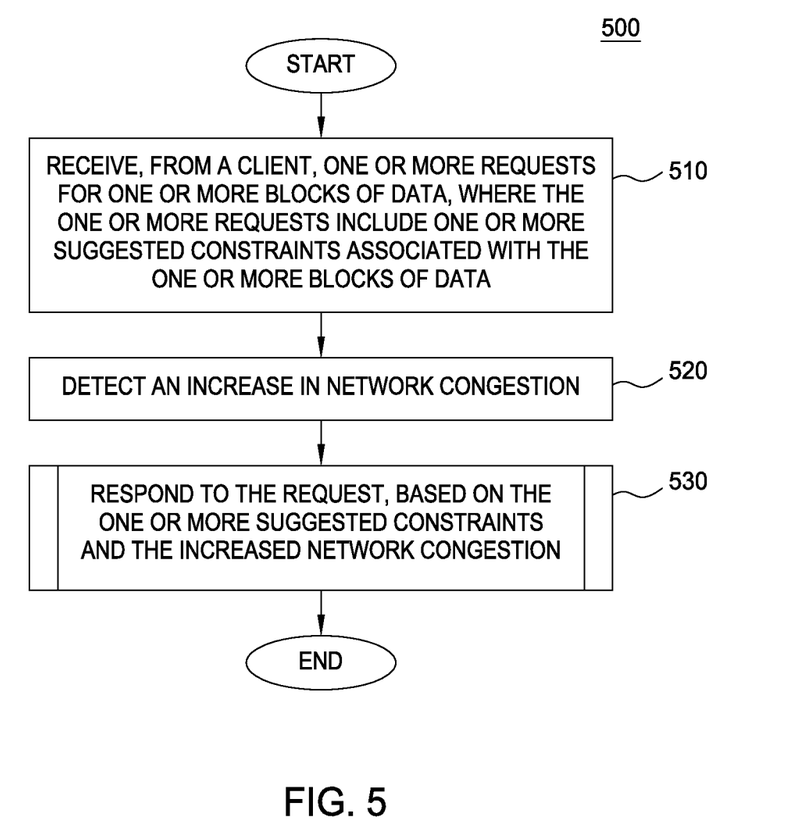
FIG. 5 is a flowchart depicting a method for handling client requests based on suggested constraints, according to one embodiment of the invention.

FIG. 5 is a flowchart depicting a method 500 for handling client requests based on suggested constraints, according to one embodiment of the invention. As shown, the method 500 begins at step 510, where the HTTP server 240 receives, from a client, a request for one or more blocks of data. The request may indicate a set of suggested constraints for responding to the request. At step 520, the HTTP server 240 detects an increase in network congestion. The increase in network congestion may be detected either before any of the requested data is sent to the client or after some of the requested data is sent.

At step 530, the HTTP server 240 responds to the request, based on the one or more suggested constraints and the increased network congestion. For example, the HTTP server 240 may decline to send each block identified in the request—either before any data is sent or after some of the requested data is sent. Alternatively, the HTTP server 240 may fulfill the request by adjusting the congestion window according to the techniques described herein, or take other actions to accommodate the request, e.g., the HTTP server could the maximum number of simultaneous requests the HTTP server 240 will accept at any given time. Step 530 is further described below in conjunction with the methods 700, 800 of FIGS. 7 and 8, respectively. After step 530, the method 500 terminates.

Figure 6:
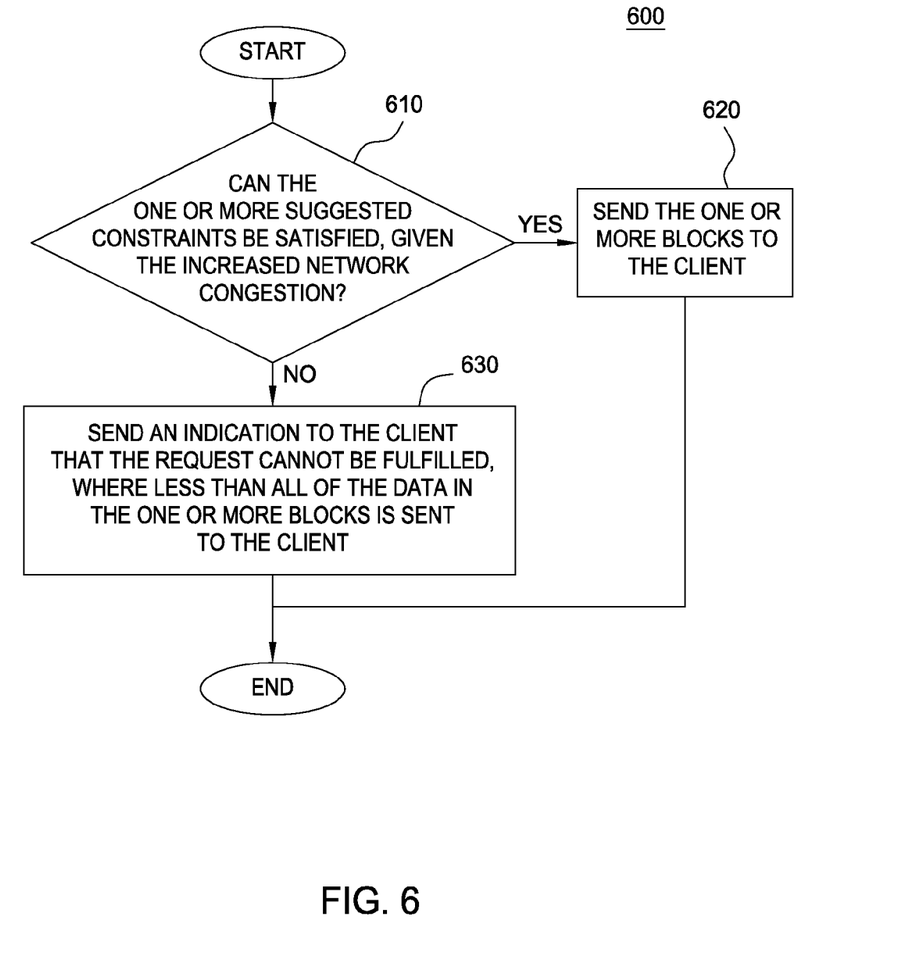
FIG. 6 is a flowchart depicting a method for responding to a client request, according to one embodiment of the invention.

FIG. 6 is a flowchart depicting a method 600 for responding to a client request, according to one embodiment of the invention. The method 600 corresponds to step 530 of FIG. 3. As shown, the method 600 begins at step 610, where the HTTP server 240 determines whether any suggested constraints can be satisfied, given the increased network congestion. If so, the HTTP server 240 sends (or continues sending) the blocks to the client (step 620). Otherwise, the HTTP server 240 sends an indication to the client that the request cannot be fulfilled, where less than all of the data in the one or more blocks is sent to the client (step 630). After the step 630, the method 600 terminates.

Figure 7:
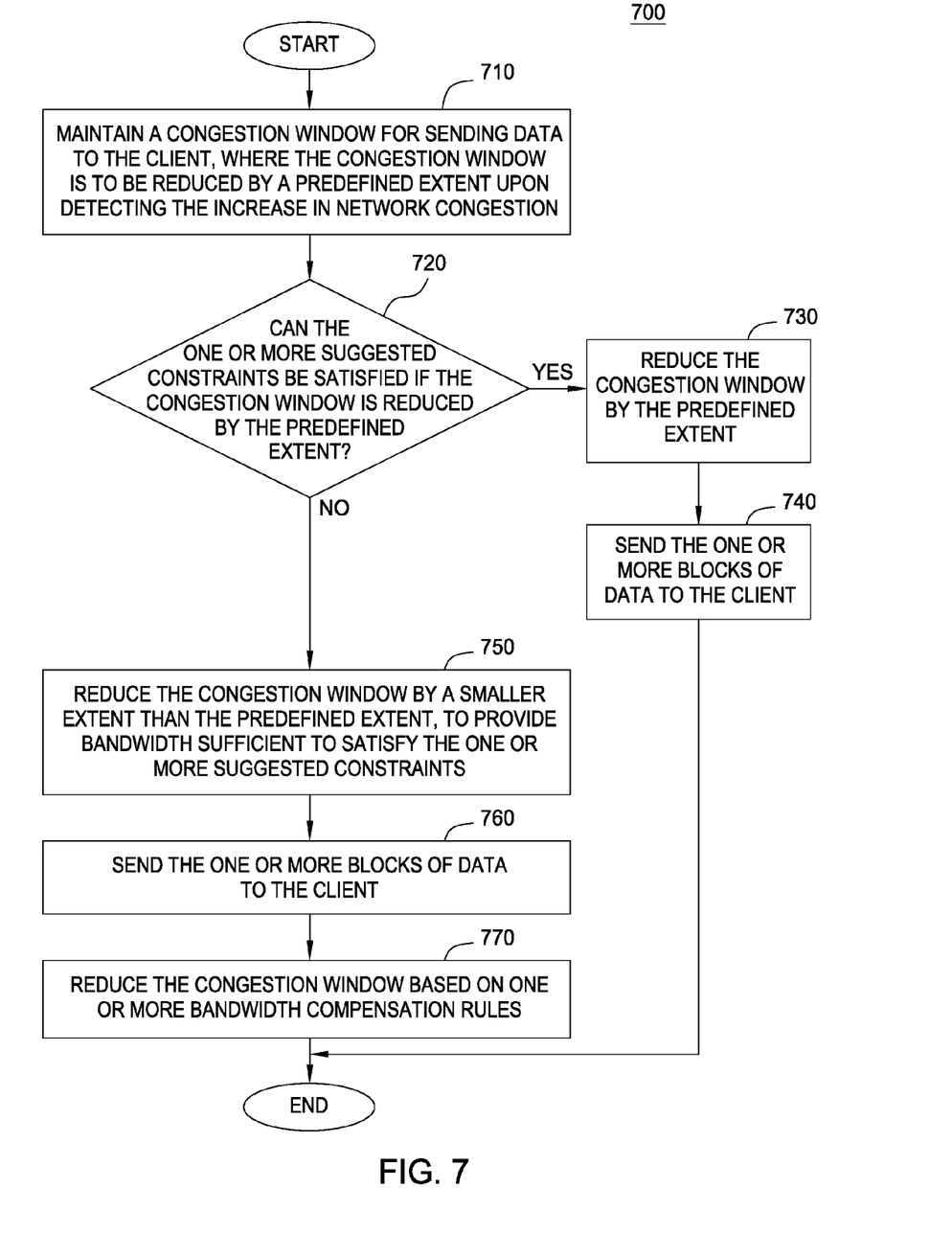
FIG. 7 is a flowchart depicting another method for responding to a client request, according to one embodiment of the invention.

FIG. 7 is a flowchart depicting another method 700 for responding to a client request, according to one embodiment of the invention. The method 700 also corresponds to the step 530 of FIG. 3. As shown, the method 700 begins at step 710, where the HTTP server 240 maintains (or continues to maintain) a congestion window for sending data to the client. Further, the HTTP server 240 is configured to reduce the congestion window by a predefined extent upon detecting the increase in network congestion. For example, reducing the congestion window by the predefined extent may include halving the congestion window.

At step 720, the HTTP server 240 determines whether the suggested constraints included in a given request can be satisfied if the congestion window is reduced. If so, the HTTP server 240 reduces the congestion window by the predefined extent (step 730), e.g., by half of the size of the congestion window, and sends blocks of data to the client (step 740). Otherwise, the HTTP server 240 may reduce the congestion window by a smaller extent (step 750), e.g., by a quarter of the size of the congestion window, and send blocks of data to the client (step 760). The congestion window is reduced by the smaller extent to provide sufficient bandwidth—despite the reduction—to nevertheless satisfy the one or more suggested constraints.

At least in some embodiments, subsequent to sending the one or more blocks of data to the client, the HTTP server 240 may also reduce the congestion window based on one or more bandwidth compensation rules (step 770). Because additional bandwidth was previously allocated to the client to satisfy the one or more suggested constraints, the client may subsequently compensate the HTTP server 240 in an amount proportional to the additional bandwidth (providing that bandwidth to other clients). As described above, the HTTP server 240 may be compensated by reducing the congestion window based on the one or more bandwidth compensation rules. After step 770, the method 700 terminates.

Advantageously, embodiments of the invention provide techniques for a web server to support constraints specified by one or more clients. In one embodiment, the web server receives, from a client, a request for one or more blocks of data. The request includes one or more constraints suggested by the client. The web server may respond to the request, by evaluating the one or more constraints against a current level of network congestion. Doing so allows bandwidth between the web server and client devices may be used more efficiently when streaming data, while retaining the general-purpose nature of the web server. Accordingly, a broad variety data streams may be provided to client devices more efficiently and/or inexpensively, relative to other approaches.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present invention is determined by the claims that follow.

We claim:

1. A computer-implemented method of responding to a request to stream data from a server to a client, based on constraints specified by the client and based further on network congestion, the computer-implemented method comprising:

receiving, from the client, one or more requests for a first plurality of data blocks encoded at a first bit rate, wherein the one or more requests comprise one or more client-specified constraints for streaming the requested data blocks to the client, including a timing constraint specifying an expiration time associated with the first plurality of data blocks;

subsequent to receiving the one or more requests, detecting an increase in network congestion, wherein the server is configured to temporarily reduce, responsive to the increase in network congestion and by a predefined amount, bandwidth for sending data to the client;

in response to detecting an increase in network congestion, servicing the one or more requests by streaming a second plurality of data blocks encoded at a second bit rate to the client rather than streaming the first plurality of data blocks to the client, wherein the second bit rate is less than the first bit rate;

determining that the one or more client-specified constraints cannot be satisfied in servicing the one or more requests using the reduced bandwidth and streaming the second plurality of data blocks; and in response, temporarily reducing the bandwidth by a lesser amount than the predefined amount, to provide bandwidth sufficient to satisfy the one or more client-specified constraints when servicing the one or more requests.

2. The computer-implemented method of claim 1, wherein the one or more client-specified constraints further comprises a rate constraint specifying a desired rate at which the first plurality of data blocks is sent.

3. The computer-implemented method of claim 1, wherein the first plurality of data blocks include a first block and a second block, and wherein at least one client-specified constraint is a dependency constraint specifying that the second block is of no use to the client unless the first block is received by the client.

4. The computer-implemented method of claim 3, wherein the first plurality of blocks include data from a digital media content stream encoded according to Scalable Video Coding (SVC), wherein the digital media content stream includes a base layer and an enhancement layer, wherein the first block includes data from the base layer, and wherein the second block includes data from the enhancement layer.

5. The computer-implemented method of claim 1, wherein the requested data is encoded at a first bit rate, wherein at least one block comprises a group of pictures (GOP), wherein the first plurality of data blocks include a subset of data blocks, wherein the subset of data blocks is requested in a single request, and wherein the single request further specifies boundary information associated with each block, wherein the boundary information comprises a byte offset.

6. A computer-readable storage device containing a program which, when executed, performs an operation for responding to a request to stream data from a server to a client, based on constraints specified by the client and based further on network congestion, the operation comprising:
receiving, from the client, one or more requests for a first plurality of data blocks encoded at a first bit rate, wherein the one or more requests comprise one or more client-specified constraints for streaming the requested blocks of data to the client, including a timing constraint specifying an expiration time associated with the one or more blocks of data;
subsequent to receiving the one or more requests, detecting an increase in network congestion, wherein the server is configured to temporarily reduce, responsive to the increase in network congestion and by a predefined amount, bandwidth for sending data to the client;
in response to detecting an increase in network congestion, servicing the one or more requests by streaming a second plurality of data blocks encoded at a second bit rate to the client rather than streaming the first plurality of data blocks to the client, wherein the second bit rate is less than the first bit rate;
determining that the one or more client-specified constraints cannot be satisfied in servicing the one or more requests using the reduced bandwidth and streaming the second plurality of data blocks; and
in response, temporarily reducing the bandwidth by a lesser amount than the predefined amount, to provide bandwidth sufficient to satisfy the one or more client-specified constraints when servicing the one or more requests.

7. The computer-readable storage device of claim 6, wherein the one or more client-specified constraints further comprises a rate constraint specifying a desired rate at which the one or more blocks of data is sent.

8. The computer-readable storage device of claim 6, wherein the one or more blocks of data include a first block and a second block, and wherein at least one client-specified constraint is a dependency constraint specifying that the second block is of no use to the client unless the first block is received by the client.

9. The computer-readable storage device of claim 8, wherein the one or more blocks include data from a digital media content stream encoded according to Scalable Video Coding (SVC), wherein the digital media content stream includes a base layer and an enhancement layer, wherein the first block includes data from the base layer, and wherein the second block includes data from the enhancement layer.

10. The computer-readable storage device of claim 6, wherein the requested data is encoded at a first bit rate, wherein at least one block comprises a group of pictures (GOP), wherein the one or more blocks of data include a plurality of blocks of data, wherein the plurality of blocks of data are requested in a single request, and wherein the single request further specifies boundary information associated with each block, wherein the boundary information comprises a byte offset.

11. A system to respond to a request to stream data to a client, based on constraints specified by the client and based further on network congestion, the system comprising:
one or more computer processors;
a memory containing a program, which when executed by the one or more computer processors performs an operation comprising:
receiving, from the client, one or more requests for a first plurality of data blocks encoded at a first bit rate, wherein the one or more requests comprise one or more client-specified constraints for streaming the requested blocks of data to the client, including a time constraint specifying an expiration time associated the one or more blocks of data;
subsequent to receiving the one or more requests, detecting an increase in network congestion, wherein the system is configured to temporarily reduce, responsive to the increase in network congestion and by a predefined amount, bandwidth for sending data to the client;
in response to detecting an increase in network congestion, servicing the one or more requests by streaming a second plurality of data blocks encoded at a second bit rate to the client rather than streaming the first plurality of data blocks to the client client, wherein the second bit rate is less than the first bit rate;
determining that the one or more client-specified constraints cannot be satisfied in servicing a first request included in the one or more requests using the reduced bandwidth and streaming the second plurality of data blocks; and
in response, temporarily reducing the bandwidth by a lesser amount than the predefined amount, to provide bandwidth sufficient to satisfy the one or more client-specified constraints when servicing the first request.

12. The system of claim 11, wherein the one or more client-specified constraints further comprises a rate constraint specifying a desired rate at which the one or more blocks of data is sent.

13. The system of claim 11, wherein the one or more blocks of data include a first block and a second block, and wherein at least one client-specified constraint is a dependency constraint specifying that the second block is of no use to the client unless the first block is received by the client.

14. The system of claim 13, wherein the one or more blocks include data from a digital media content stream encoded according to Scalable Video Coding (SVC), wherein the digital media content stream includes a base layer and an enhancement layer, wherein the first block includes data from the base layer, and wherein the second block includes data from the enhancement layer.

15. The system of claim 14, wherein the program comprises a web server application, wherein both the web server application and the client are preconfigured to support both:

(i) a predefined application protocol for streaming data between the web server application and the client, the predefined application protocol not providing support for client-specified constraints; and (ii) an extension to the predefined application protocol, the extension providing support for client-specified constraints;

wherein the extension to the predefined application protocol is supported in a manner that provides backward-compatibility with: (i) clients that do not support the extension and (ii) servers that do not support the extension;

wherein the web server application does not require the client to communicate with a same instance of the web server application for an entirety of a data stream transmitted from the HTTP server to the client.

16. The system of claim 15, wherein the one or more requests includes a second request a third request, and a fourth request each having respective one or more client-specified constraints, wherein the operation includes:

only upon determining that the one or more client-specified constraints of the second request cannot be satisfied in servicing the second request using a first reduced bandwidth, abandoning the second request;

only upon determining that the one or more client-specified constraints of the third request cannot be satisfied in servicing the third request using a second reduced bandwidth, then prior to reducing the bandwidth by a second predefined amount, temporarily reducing the bandwidth by a second lesser amount than the second predefined amount; and only upon determining that the one or more client-specified constraints of the fourth request cannot be satisfied in servicing the fourth request using a third reduced bandwidth, then subsequent to reducing the bandwidth by a third predefined amount, temporarily reducing the bandwidth by a third lesser amount than the third predefined amount.

17. The system of claim 16, wherein at least one client-specified constraint comprises, in respective instances:

(i) a timing constraint specifying an expiration time of the one or more blocks of data;

(ii) a rate constraint specifying a desired rate at which the one or more blocks of data is sent; and (iii) the dependency constraint;

wherein the web server application, in a first instance, honors the one or more client-specified constraints for a fifth request included in the one or more requests by temporarily reducing the bandwidth by a lesser amount than the predefined amount, wherein the web server, in a second instance, does not honor the one or more client-specified constraints for the fifth request, by:

temporarily reducing, responsive to the increase in network congestion and by the predefined amount, bandwidth for sending data to the client, wherein the temporarily reduced bandwidth is insufficient to satisfy the one or more client-specified constraints for the fifth request.

18. The system of claim 17, wherein the at least one client-specified constraint in a given instance comprises a plurality of constraints including the timing constraint, the rate constraint, and the dependency constraint;

wherein abandoning second request comprises sending an indication to the client that the one or more requests cannot be fulfilled, in which case less than all of the data in the one or more blocks is sent to the client.

19. The system of claim 11, wherein the program comprises a web server application that maintains a congestion window for sending data to the client, wherein reducing the bandwidth by a predefined amount comprises reducing the congestion window by a predefined extent, wherein the operation further comprises:

subsequent to servicing the first request by reducing the bandwidth by the lesser amount, temporarily reducing a bandwidth for servicing a subsequent request from the client, wherein the bandwidth for servicing the subsequent request is reduced based one or more bandwidth compensation rules, wherein the one or more bandwidth compensation rules specify to reduce the bandwidth to an extent proportional to the predefined amount minus the lesser amount.

20. The system of claim 11, wherein the program comprises a web server application, and both the web server application and the client are configured to support a predefined application protocol comprising Hypertext Transfer Protocol (HTTP), wherein the requested data is encoded at a first bit rate, wherein at least one block comprises a group of pictures (GOP), wherein the first plurality of data blocks is requested in a single request, and wherein the single request further specifies boundary information associated with each block, wherein the boundary information comprises a byte offset.

* * * * *